US006771375B2

(12) United States Patent
Zanoni

(10) Patent No.: US 6,771,375 B2
(45) Date of Patent: Aug. 3, 2004

(54) APPARATUS AND METHOD FOR MEASURING ASPHERICAL OPTICAL SURFACES AND WAVEFRONTS

(75) Inventor: Carl A. Zanoni, Middlefield, CT (US)

(73) Assignee: Zygo Corporation, Middlefield, CT (US)

(*) Notice: Subject to any disclaimer, the term of this patent is extended or adjusted under 35 U.S.C. 154(b) by 53 days.

(21) Appl. No.: 10/152,075

(22) Filed: May 21, 2002

(65) Prior Publication Data

US 2003/0002048 A1 Jan. 2, 2003

Related U.S. Application Data

(60) Provisional application No. 60/299,512, filed on Jun. 20, 2001.

(51) Int. Cl.[7] .......................... G01B 11/02; G01B 11/00; G01B 9/02
(52) U.S. Cl. ...................... 356/512; 356/359; 356/489; 356/495; 356/513; 356/514
(58) Field of Search ................................. 356/512, 359, 356/489, 495, 513, 514

(56) References Cited

U.S. PATENT DOCUMENTS 4,340,306 A * 7/1982 Balasubramanian (List continued on next page.)

OTHER PUBLICATIONS

Lin, Ding–tin, and Wan, Der–Shen, "Profile Measurement Of An Aspheric Cylindrical Surface From Retroreflection." Applied Optics, vol. 30, No. 22 (Aug. 1, 1991): pp. 3200–3204.

(List continued on next page.)

Primary Examiner—Frank G. Font
Assistant Examiner—Khaled Brown
(74) Attorney, Agent, or Firm—Francis J. Caufield

(57) ABSTRACT

Interferometric method(s) and apparatus for accurately measuring aspherical surfaces and transmitted wavefronts, particularly of the type having relatively large diameters and departure employed in lithographic applications used in the fabrication of integrated circuits and the like. An interferometer, preferably of the Fizeau type, is provided with at least one aspherical reference surface that is positioned adjacent the test optic. The test optic can be either rotationally or non-rotationally symmetric, a reflecting aspherical test surface, or a refracting system that is illuminated by an aspherical wavefront or produces a transmitted aspherical wavefront. In any case, the departure of the test optic from its intended performance is ultimately determined. The aspherical reference surface is illuminated by an aspherical wavefront provided by upstream optics structured so that the incident aspherical wavefront propagates normal to the aspherical reference surface across its entire surface. The illuminating aspherical wavefront is partially reflected and partially transmitted by the reference surface to provide an aspherical measurement wavefront that is incident to the test optic and has a shape nominally the same as that of the test surface in the reflective case or of the design transmitted wavefront in the refractive case. The aspherical test surface reflects the incident aspherical wavefront and it combines with the reference aspherical wavefront to provide an interferogram containing phase information indicative of the shape of the wavefront generated by the test optic. The interferogram is imaged onto a preferably two dimensional photodetection system that provides an output signal that is analyzed to extract the relevant phase information and convert it to numerical and display form. Phase shifting interferometric techniques are preferably used in the performance of the analysis along with alignment apparatus and procedures for assuring accurate measurement of the test optic.

15 Claims, 5 Drawing Sheets

U.S. PATENT DOCUMENTS

| | | | |
|---|---|---|---|
| 4,347,441 A | | 8/1982 | Dil et al. |
| 4,387,994 A | * | 6/1983 | Balasubramanian |
| 4,758,089 A | * | 7/1988 | Yokokura et al. |
| 4,776,101 A | * | 10/1988 | Ishibai |
| 4,872,755 A | * | 10/1989 | Kuchel |
| 5,004,346 A | | 4/1991 | KuMichael |
| 5,416,586 A | | 5/1995 | Tronolone et al. |
| 5,625,454 A | * | 4/1997 | Huang et al. |
| 6,312,373 B1 | | 11/2001 | Ichihara |
| 6,344,898 B1 | * | 2/2002 | Gemma et al. |
| 6,359,692 B1 | | 3/2002 | de Groot |
| 6,456,382 B2 | * | 9/2002 | Ichihara et al. |
| 2001/0028462 A1 | | 10/2001 | Ichihara et al. |

OTHER PUBLICATIONS

Dörband, B. et al. "High Precision Interferometric Measurements Of Lens Elements." Fringe '97: Proceedings of the 3rd International Workshop on Automatic Processing of Fringe Patterns Held in Bremen, Germany, Sep. 15–17, 1997. pp. 473–480.

* cited by examiner

US 6,771,375 B2

APPARATUS AND METHOD FOR MEASURING ASPHERICAL OPTICAL SURFACES AND WAVEFRONTS

CROSS REFERENCE TO RELATED APPLICATION

This application claims benefit from U.S. Provisional Patent Application No. 60/299,512 filed on Jun. 20, 2001, the entire contents of which are incorporated herein by reference.

FIELD OF THE INVENTION

This invention generally relates to the field of interferometry and, in particular, to apparatus and method(s) for the high accuracy measurement of aspherical optical surfaces and wavefronts using the interference of light.

BACKGROUND OF THE INVENTION

A single aspherical optical surface can be used to replace several conventional spherical or plano optical surfaces or elements in an optical system to improve the system's optical performance by reducing optical aberrations and increasing optical transmission, for example. In lithography tools where use is made of shorter wavelengths to make integrated circuits, the limited choice of materials from which refractive optical elements can be made necessitates the use of refractive and reflective aspherical optical surfaces to achieve the ever increasing performance demands for this application. Surface errors for optical surfaces needed for extreme ultraviolet (EUV) lithography tools operating at wavelengths of 13.6 nm, for example, must be less than 0.1 nm for reflective aspherical surfaces. Not only are the tolerances for the measurement accuracy increasing, but the magnitude of the aspherical departure from a reference sphere is increasing, for example, to nearly 1000 micrometers for some applications. As the integrated circuit line widths shrink, the size (diameter) of the optical elements is increasing to nearly 500 millimeters.

The measurement of aspherical surfaces and wavefronts has been very difficult because of the large departure from a best-fit reference sphere thereby producing an interferogram with many fringes that are very closely spaced. Prior art techniques have used some sort of aspherical null to mitigate this problem. Also, the Nyquist condition which requires at least two pixels per fringe, imposes a severe limit on what can be measured with available 2-D cameras. Since fringe spatial density is proportional to the slope of the aspherical surface, or wavefront, even weakly aspherical surfaces and wavefronts will violate the Nyquist condition. Typically, prior art systems are limited to surfaces with no more than 10–20 waves of aspherical departure.

In addition, for many of the prior art techniques, the wavefront difference measured in the interferogram is not simply the difference between the test and reference wavefronts. An aspherical measurement system requires that the entire interferometric measurement system, including all of the interferometer's optics, be ray traced for the aspherical surface under test. This requirement understandably complicates the calibration of the measurement system and also reduces the accuracy of the measurements.

While high accuracy aspherical optical surfaces have been difficult and expensive to make, thereby limiting their use, there have been improvements in the fabrication of aspherical surfaces which will make them more prevalent. With fabrication improvements in, for example, magneto-rheological finishing, ion figuring, and computer controlled polishing, there is a concomitant need for improved aspherical measurement methods and apparatus to provide the error maps for these manufacturing methods to enable them to produce the aspherical optical surfaces needed to meet the requirements of integrated circuit lithography tools such a steppers and scanners operating at wavelengths of 193 nm, 157 nm, and 13.6 nm, for example.

There are many methods and apparatus in the prior art for measuring aspherical optical surfaces, for example: 1. Contacting and non-contacting stylus based profilers; 2. Contacting and non-contacting stylus based coordinate measuring machines; 3. Spherical wavefront interferometers; 4. Lateral and radial shearing interferometers; 5. Interferometers with null lenses in the measurement path; 6. Scanning spherical wave interferometers; 7. Scanning white light interferometers; 8. Sub-aperture stitching interferometers; 9. Interferometers using computer generated holograms-CGHs; 10. Point diffraction interferometers-PDIs; 11. Longer wavelength interferometry; and 12. Two wavelength interferometry. While these techniques have utility for many applications, they are limited in their operational capabilities or precision compared with those needed for today's evolving lithography applications.

Contacting and non-contacting stylus based profilers mechanically scan the aspherical surface under test and, therefore, are slow because they measure only a few data points at a time. Slow techniques are very susceptible to measurement errors due to temperature variations during the measurement. The same limitations apply to contacting and non-contacting stylus based coordinate measuring machines.

Spherical wavefront interferometers usually require the spacing between the element generating the spherical wavefront and the aspherical surface under test to be scanned thereby increasing the measurement time for the entire surface under test thus introducing another parameter which must be measured, usually by another measurement device, and means, commonly known as stitching, for connecting the data from the various zones which fit as the spacing is scanned.

Scanning white light interferometers have many of the same limitations as spherical wavefront interferometers. Lateral and radial shearing interferometers usually measure the slope of the surface under test and thereby introduce measurement errors during the reconstruction of the surface under test via integration of the slopes. This latter type of limitation applies to differential types of profiling techniques as well.

Sub-aperture stitching interferometers introduce serious measurement errors in the stitching process. Interferometers using computer generated holograms are susceptible to errors introduced by the CGH and stray Moiré patterns. It is also difficult to calibrate, i.e., know the calibration of the CGH. Point diffraction interferometers are a class of spherical wavefront interferometers, and therefore, have many of the same limitations, as well as poor lateral spatial resolution.

None of the prior art approaches is entirely satisfactory since each involves a trade-off that places long lead times on the design of the measurement apparatus and method, requires additional fabrication, increases the difficulty of using and calibrating the measurement apparatus, decreases the accuracy and precision, and greatly increases the cost and delivery time of the aspherical optical element Consequently, it is a primary object of the present invention to provide a method and apparatus for the high accuracy measurement of aspherical optical surfaces and wavefronts.

It is another object of the present invention to provide methods and apparatus for accurately measuring surfaces and wavefronts with large aspherical departures and surface slopes.

Yet another object of the present invention is to provide methods and apparatus for accurately measuring aspheric surfaces and wavefronts with large diameters (clear apertures).

Still another object of the present invention is to provide interferometric methods and apparatus for accurately measuring aspheric surfaces and wavefronts with no refractive optics in the interferometer (measurement) cavity.

Yet another object of the present invention is to provide methods and apparatus for accurately measuring aspheric surfaces and wavefronts with reduced sensitivity to temperature changes.

It is yet another object of the present invention is to provide methods and apparatus for accurately measuring aspheric surfaces and wavefronts with reduced sensitivity to turbulence of the gas in the interferometer (measurement) cavity.

Yet another object of the present invention is to provide methods and apparatus for accurately measuring aspheric surfaces and wavefronts with high speed.

Still another object of the present invention is to provide methods and apparatus for accurately measuring aspheric surfaces and wavefronts while meeting the Nyquist condition for the most challenging applications And another object of the present invention is to provide high spatial data density methods and apparatus for accurately measuring aspheric surfaces and wavefronts.

It is another object of the present invention is to provide methods and apparatus for accurately measuring aspheric surfaces while having a relaxed tolerance to which the position on the aspherical surface from which the measurement data is gathered.

Yet another object of the present invention is to provide methods and apparatus for accurately measuring aspheric surfaces and wavefronts while having relaxed tolerance for ray tracing the interferometer's optical system.

Still another object of the present invention is to provide methods and apparatus for accurately measuring aspheric surfaces and wavefronts while providing an error map used in the production of aspherical optical surfaces and their assembly into lens systems.

Still another object of the present invention is to provide methods and apparatus for measuring aspheric wavefronts.

Yet another object of the present invention is to provide methods and apparatus for accurately measuring aspheric surfaces in the volume production of aspherical optical surfaces and their assembly into lens systems.

Other objects of the invention will in part be obvious and will in part appear hereinafter when the following detailed description is read in connection with the accompanying drawings.

SUMMARY OF THE INVENTION

This invention relates to interferometric methodologies for the accurate measurement of aspherical surfaces and wavefronts. Method(s) and apparatus of the invention are provided for measuring aspherical optical surfaces and wavefronts that may be of large diameter and include substantial aspheric departures. The apparatus of the invention in one aspect comprises an interferometer, preferably a Fizeau interferometer, having an optical system which contains an aspherical reference surface which is illuminated by an incident aspherical wavefront generated by either refractive or diffractive optics located upstream of it. The incident aspherical wavefront is normal to the aspherical reference surface. The aspherical reference surface acts as both a beamsplitter and a reference surface for the interferometer. The aspherical reference surface reflects a portion of the incident aspherical wavefront into a reference wavefront and transmits a portion of the incident aspherical wavefront into an aspherical measurement wavefront. The aspherical reference surface and the aspherical surface under test are preferably separated by a small distance, d, so as to minimize environmentally induced measurement errors and noise. The aspherical measurement wavefront propagates normal to and is reflected by the aspherical surface under test, and the reflected aspherical measurement wavefront is recombined with the reference aspherical wavefront to form an interferogram which is indicative of the shape of the aspherical surface under test. The phase of the resulting interferogram is modulated, preferably by wavelength modulation, using any of the well known techniques for this purpose. In the instant invention, angular and positional alignment of the aspherical surface under test to the aspherical reference surface is done by analysis of the interferogram. The aspherical surface under test can then be mechanically aligned with coarse and fine positioning actuators which can be either under manual or computer control. Analysis of the final interferogram provides values of any residual misalignments.

In another aspect of the apparatus of the invention, aspheric wavefronts from one or more refractive elements are measured to determine the departure of their transmitted wavefronts compared with those anticipated.

In yet another aspect of the invention apparatus and methods are provided for aligning the aspheric reference surface with the aspheric wavefront illuminating it.

BRIEF DESCRIPTION OF THE DRAWINGS

The structure, operation, and methodology of the invention, together with other objects and advantages thereof, may best be understood by reading the detailed description in conjunction with the drawings in which each part has an assigned numeral that identifies it wherever it appears in the various drawings and wherein.

DETAILED DESCRIPTION OF THE INVENTION

Figure 1:
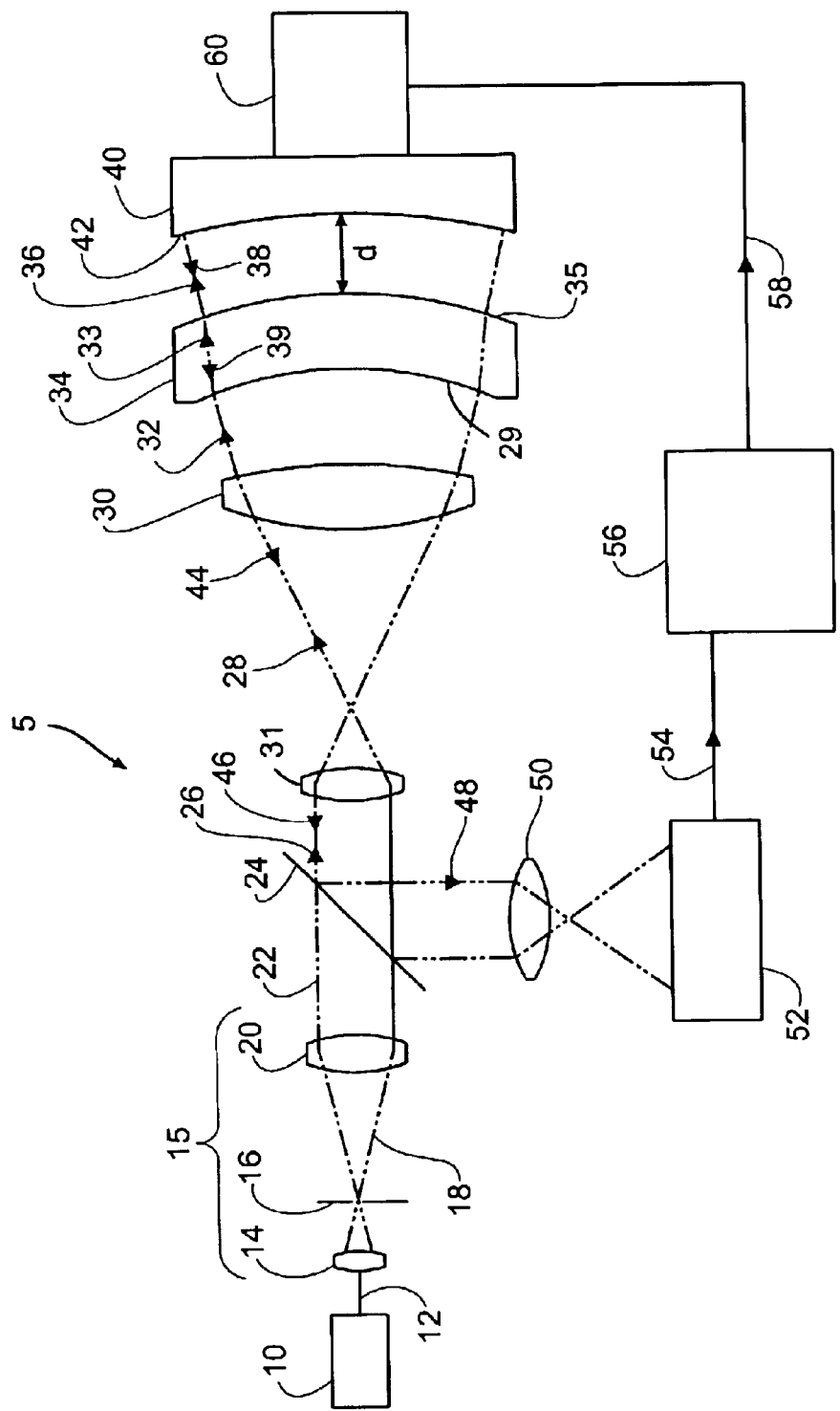
FIG. 1 is a diagrammatic side elevational view of the invention shown measuring an aspherical surface.

Reference is now made to FIG. 1, which shows an interferometric apparatus of the invention for accurately measuring aspherical surfaces, particularly of the type required for use in lithographic applications operating in the ultraviolet and extreme ultraviolet regions of the spectrum. As seen in FIG. 1 the interferometric apparatus of the invention is depicted as an interferometric system designated generally at 5. The major components of interferometric system 5 comprise a light source 10 for generating an output beam 12, an illuminator 15 for receiving output beam 12 and generating a collimated beam 22, a beamsplitter 24, an optical system comprising elements 30, 31 and, as needed, portions of an element 34 that carries a front surface 35, which is an aspherical reference surface, a two-dimensional photodetection system 52, and a multi degree of freedom mounting system 60 for precisely controlling the position and attitude of a component under test designated generally as 40. A general-purpose computer 56 or dedicated microprocessor is provided for performing analytical tasks, general housekeeping, and an interface for an operator to issue commands to the system so that it can perform its functions in an orderly fashion.

Light source 10 is preferably a laser having an output wavelength that is selected based on the reflectivity of a surface under test, and may be either cw or pulsed. The coherence length of the light source 10 is chosen to be at least equal to or greater than 2 d. For an application of the embodiment being described, the coherence length is preferably on the order of between 5 mm to 10 mm.

Illuminator 15 comprises a converging lens 14 that focuses output beam 12 onto a pinhole 16 beyond which this focused beam expands to impinge on a collimator lens to provide a collimated beam 22 having a substantially plane wavefront. Illuminator 15 preferably is artifact free in the manner of, for example, the source described in U.S. patent application Ser. No. 09/848,055 filed on May 3, 2001 with the title "APPARATUS AND METHOD(S) FOR REDUCING THE EFFECTS OF ARTIFACTS IN AN INTERFEROMETER, the contents of which are incorporated herein by reference in their entirety, or may not require a pinhole, if other components of the system accommodate the use of other than plane waves in the otherwise collimated space following collimator lens 20.

Beamsplitter 24 is placed in the collimated space between collimator lens 20 and converging lens 31 and is structured to transmit collimated beam 26 upstream for subsequent use and to reflect return beams toward photodetection system 52.

Figure 2:
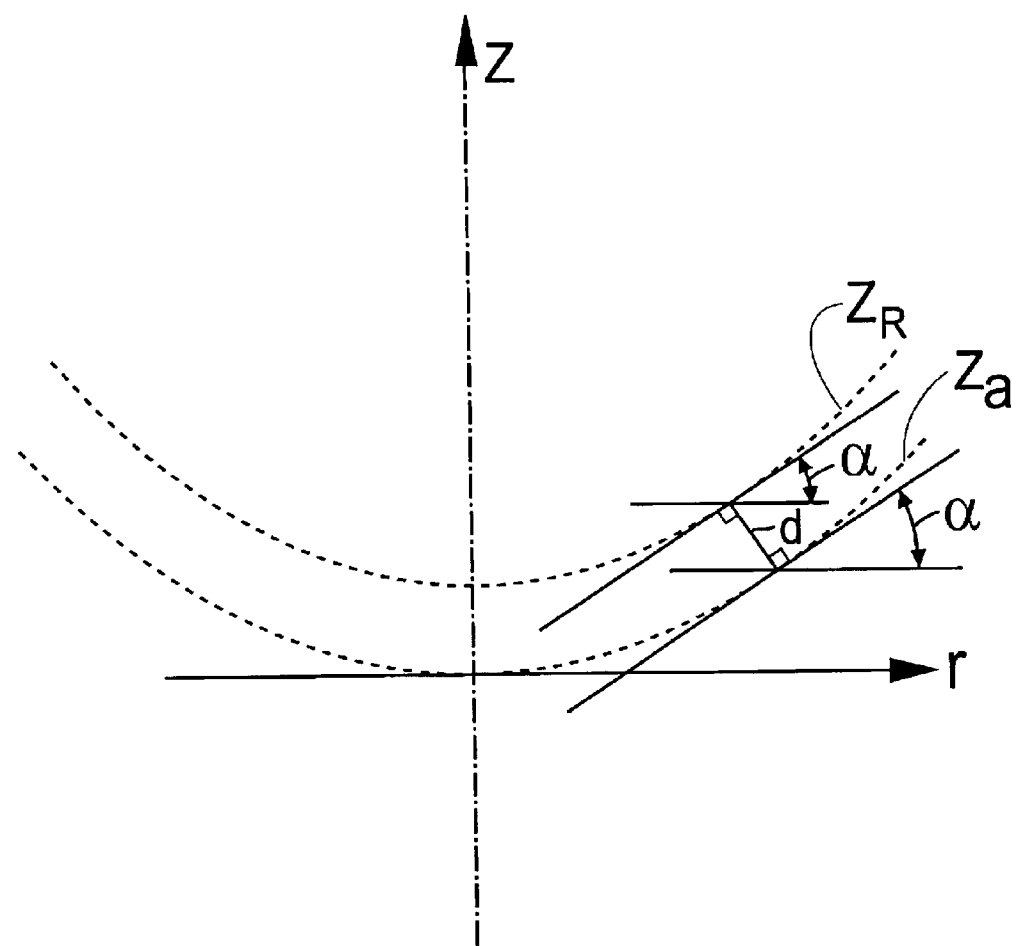
FIG. 2 is a diagrammatic drawing illustrating the properties and relationships among various surfaces appearing in FIG. 1.

Element 34 carries as its front surface an aspherical reference surface 35 designated as $Z_R(r)$ in FIG. 2, and test element 40 carries as its rear surface an aspherical surface 42 designated as $Z_a(r)$ in FIG. 2. $Z_a(r)$ is the equation of the aspherical surface under test 42, and its nominal shape and tolerances are known from the optical design. The slope of $Z_a(r)$ is obtained by differentiation to give:

$$\tan \alpha(r) = dZ_a(r)/dr \quad (1)$$

As can be seen from FIG. 2, the shape of the reference surface 35 is given by:

$$Z_r(r) = Z_a(r + d \sin \alpha) + (d \cos \alpha) \quad (2)$$

The reference aspherical surface 35 may be fabricated and tested using well-known metrology techniques previously mentioned or by using the technique described in U.S. patent application No. 10/160,672 published on Dec. 20, 2002 as U.S.-2003-0002049 A1, the entire contents of which are incorporated herein by reference.

Thus, interferometric system 5 comprises an interferometer, preferably a Fizeau interferometer, having an optical system which contains an aspherical reference surface 35. Aspherical reference surface 35 is illuminated by an incident aspherical wavefront 33 generated by optics located upstream of it; namely, the combination of lenses 30, 31, and a rear surface 29 of element 34. Lens 31 operates on collimated beam 26 (plane wavefront) to converge it after which it proceeds towards lens 30 as a diverging wavefront 28. Lens 30 operates on wavefront 28, further shaping it so that it emerges from lens 30 as wavefront 32. Wavefront 32 then encounters the rear surface 29 of reference element 34 and then impinges on reference surface 35 as aspherical wavefront 33. In this manner, the foregoing combination of elements is designed to operate on collimated beam 26 to provide an incident aspherical wavefront 33 that is normal to the aspherical reference surface 35.

The aspherical reference surface 35 acts as both a beamsplitter and a reference surface for the interferometer. The aspherical reference surface 35 reflects a portion of the incident aspherical wavefront 33 into a reference wavefront 39 and transmits a portion of the incident aspherical wavefront 33 into an aspherical measurement wavefront 36.

The aspherical reference surface 35 and the aspherical surface under test 42 are preferably separated by a small distance, d, so as to minimize environmentally induced measurement errors and noise and higher order errors in the measurement resulting from errors in the aspherical shape of the wavefront impinging on aspherical reference surface 35. The aspherical measurement wavefront 38 is propagates normal to and is reflected by the aspherical surface under test 42, and the reflected aspherical measurement wavefront 38 is combined with the reference aspherical wavefront 39 to form an interferogram which is indicative of the shape of the aspherical surface, under test. For this purpose, the two interfering beams should be nearly the same intensity to provide maximum fringe contrast.

The combined interfering wavefront is a more or less distorted wavefront initially inside of reference element 34 and thereafter travels as wavefront 44 that proceeds through element 31, emerging therefrom as wavefront 46. Wavefront 46 is reflected downwardly by beamsplitter 24 as wavefront 48, which is thereafter imaged onto photodetection system 52 as the final interferogram via lens 50. Photodetection system 52 is preferably two-dimensional, having a two-dimensional photosensitive array, and may be in the form of a shuttered or unshuttered electronic, video, or solid state camera provided with a CCD, or the like. A zoom lens also may be used under appropriate conditions, and rotating ground glass or similar coherence busters may be used either before the camera or in the path of the light source. The output of photodetection system 52 is fed to computer 56 as electrical signal 54.

The phase of the resulting interferogram is modulated, preferably by wavelength modulation, using any of the well known techniques for this purpose. In the instant invention, angular and positional alignment of the aspherical surface 42 under test to the aspherical reference surface 35 is done by analysis of the interferogram through the use of well-known algorithms resident as computer instructions on computer 56. Position and attitude of test element 40 is preferably made via a well-known positioning device 60 under control of computer 56 and provided with, for example, five to six degrees of freedom to control translation and angular orientation of element 40, and thus test surface 42. In this manner, the aspherical surface 42 under test can be mechanically aligned with coarse and fine positioning actuators which can be under either manual or computer control. Analysis of the final interferogram provides values of any residual misalignments.

Figure 3:
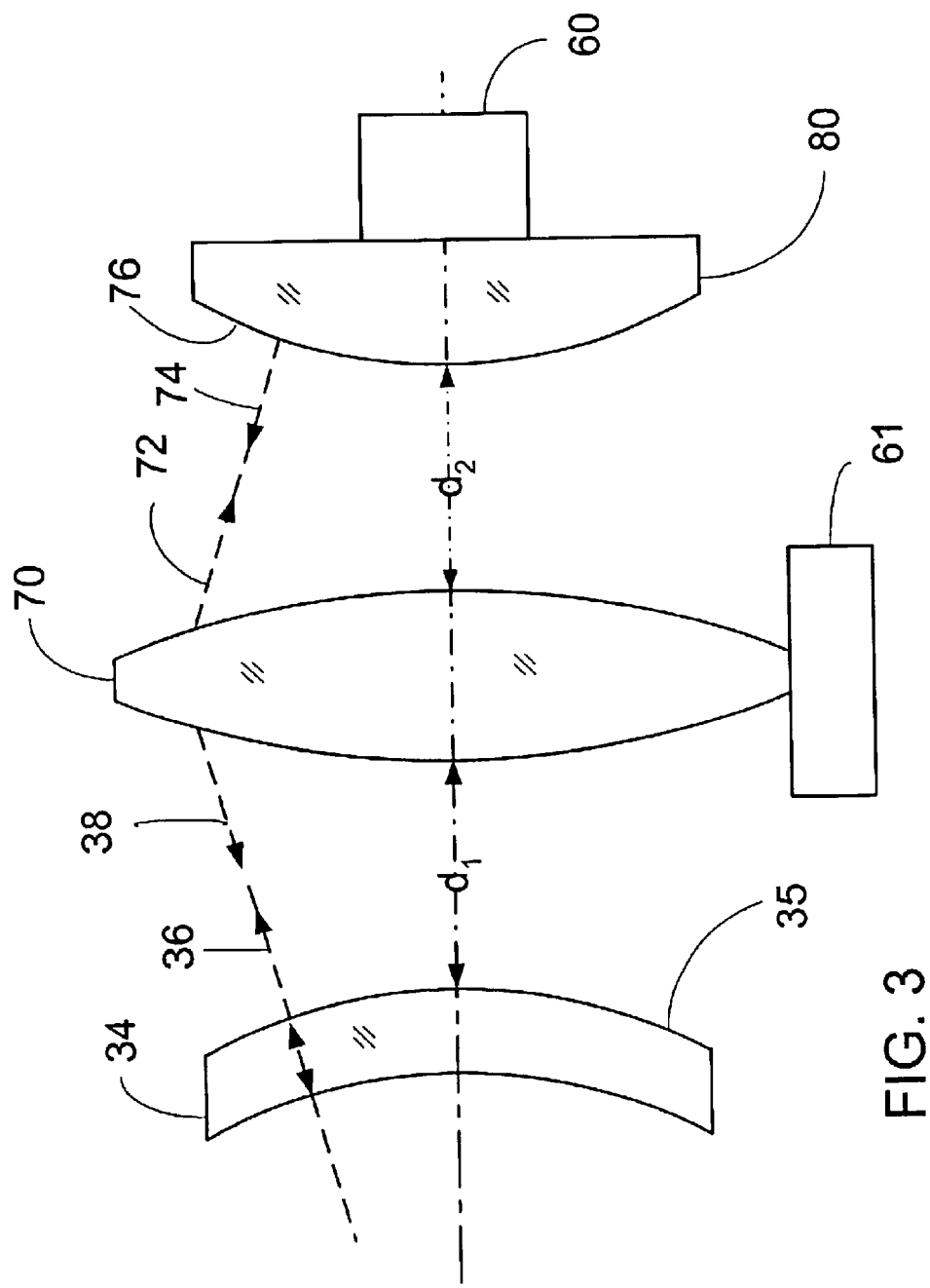
FIG. 3 is a diagrammatic drawing illustrating portions of an embodiment of the invention for measuring the transmitted wavefront through one or more refracting optical elements.

Referring now to FIG. 3, there is shown an arrangement of the invention by which a refractive element or group of refractive elements such as those, e.g., found in a lithographic lens for fabricating integrated circuits, or the like, may be measured. Such refracting systems may include aspherical surfaces or not and may have incident aspherical wavefronts or emergent transmitted aspherical wavefronts. The refractive element to be measured is designated diagrammatically at 70 and is mounted on a well-known positioning device 61 between reference elements 34 and 80. As before, positioning device 61 is under the control of computer 56. Reference element 34 carries an aspherical reference surface 35, and reference element 80 carries an aspherical reference surface 76. Reference aspherical surfaces 35 and 76 are not necessarily identical. As before, an aspherical wavefront 36 of well-defined shape is provided and is directed through test element 70 after which it emerges as wavefront 72. Wavefront 72 is reflected off aspherical reference surface 76 as wavefront 74. Surface 76 is configured so that wavefront 72 strikes it at normal incidence over its entire surface. Wavefront 74 emerges from element 70 as wavefront 38, which is combined with a reference aspherical wavefront to form an interferogram as before. Aspheric wavefront 36 and the shape of surfaces 35 and 76 are obtained based on the optical design of refractive element 70 as are the spacings $d_1$ and $d_2$ shown in FIG. 3. The interferogram is imaged and analyzed in the manner previously described in connection with FIG. 1 to determine the shape of the wavefront transmitted by element 70 and compare it with its ideal. Positioning devices 60 and 61 may be used throughout for alignment and measurement purposes.

Here, light source 10 is preferably a laser having an output wavelength at or near the operating wavelength of the component to be tested, typically 193 nm, 157 nm, or 13.6 nm, and may be either cw or pulsed.

To align elements 34 and 80, a master element 70 is first made to required precision and then the master is placed in the measurement station and elements 34 and 80 are appropriately adjusted to desired alignment. Afterwards, the master is removed and replaced with test elements.

Other embodiments of the invention will occur to those skilled in the art. For example, aspherical reference surface, $Z_R(r)$; $Z_a(r)$ and $Z_R(r)$ need not be rotationally symmetric, and the foregoing analysis can be applied to such non-rotationally symmetric aspherical surfaces as well. In the case of non-rotationally symmetric surfaces or wavefronts, the shape is given by, $Z_a(x,y)$, and the corresponding equations analogous to those derived for the symmetric case in connection with FIG. 2 are given by:

$$\tan\alpha_1 = \frac{\partial Z_a}{\partial x} \tag{3}$$

$$\tan\alpha_2 = \frac{\partial Z_a}{\partial y} \tag{4}$$

where $\alpha_1$ and $\alpha_2$ are the local slopes and the shape of the reference surface is:

$$Z_r(X,Y) = Z_a(x + d\sin\alpha_1, y - d\sin\alpha_2) + d(1 - \sin^2\alpha_1 - \sin^2\alpha_2)^{1/2} \tag{5}$$

with:

$$\alpha_1 = \tan^{-1}\left(\frac{\partial Z_a}{\partial x}\right) \tag{6}$$

and $$\alpha_2 = \tan^{-1}\left(\frac{\partial Z_a}{\partial y}\right). \tag{7}$$

Figure 4:
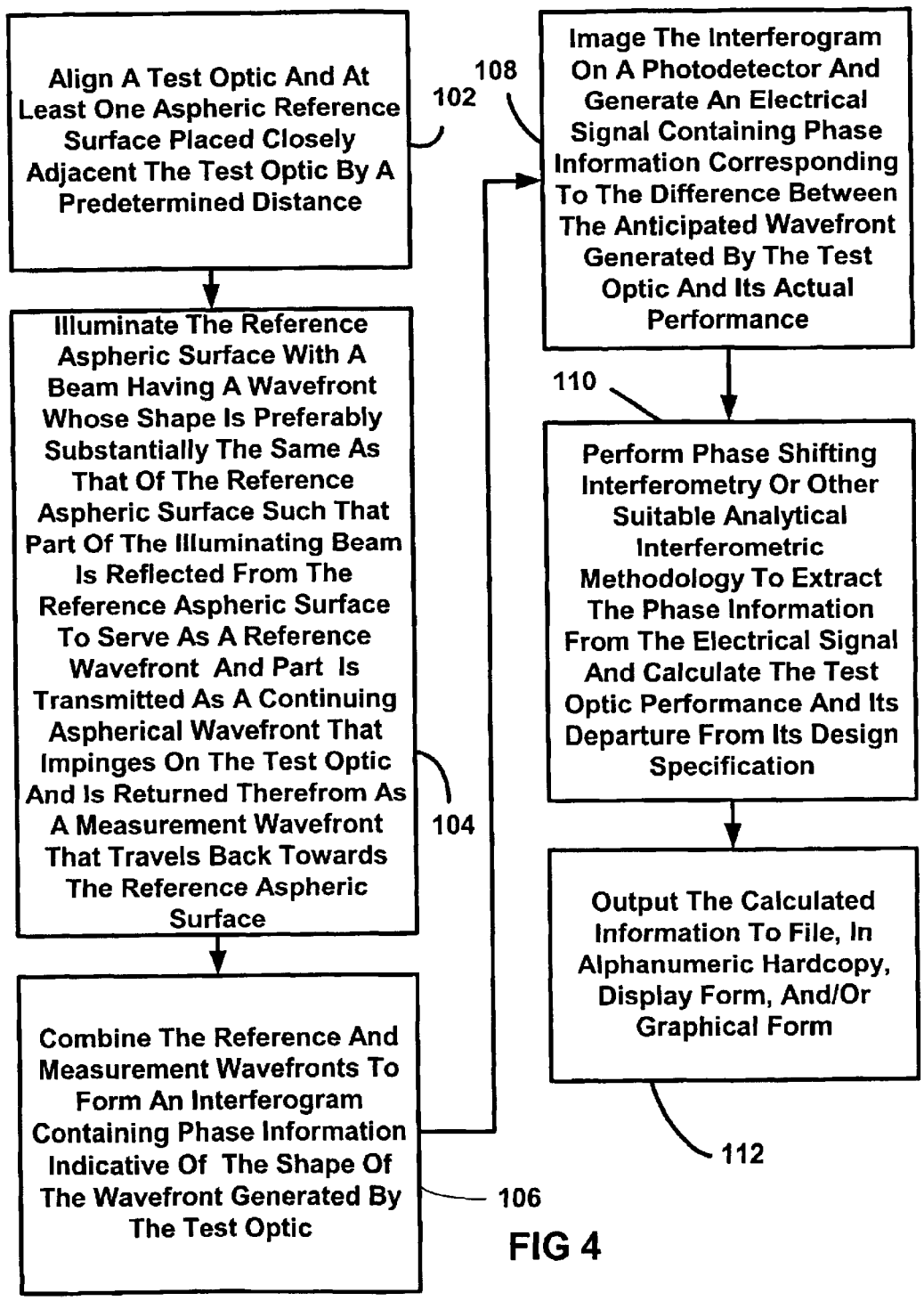
FIG. 4 is a flowchart of a method for practicing the invention.

Having described apparatus for practicing the invention, another aspect of the invention in the from of a method for its practice will now be described since the method may be carried out in interferometer architectures other than just Fizeau types. Referring now to FIG. 4, there is shown a flowchart illustrating various steps of a method for practicing the invention. As seen there, the method comprises the set of aligning a test optic and at least one aspheric surface reference surface placed closely adjacent the test optic by a predetermined distance (Block 102). As noted above, the test optic can be reflective or refractive or may be a group of refractive elements collectively acting to provide a transmitted aspherical wavefront output in accordance with its design specification as, for example, a compound lithographic lens for fabricating integrated circuits and the like.

As indicated in Block 104, this is followed by illuminating the reference aspheric surface with a beam having a well-defined wavefront whose shape is preferably substantially the same as that of the reference aspheric surface. The well-defined wavefront may be diverging or converging even though illustrated previously as diverging. The well-defined wavefront has part of it reflected from the reference aspheric surface to serve as a reference wavefront and part of it is transmitted through the reference aspheric surface as a continuing wavefront that impinges on the test optic (reflective or refractive, as the case may be) after which it is returned as a measurement wavefront that travels back towards the reference aspheric surface.

Next, the reference and measurement wavefronts are combined to form an interferogram containing phase information indicative of the shape of the wavefront generated by the test optic (Block 106). In the refractive case, a portion of the reference wavefront travels through the test surfaces, reflects from another reference surface, passes back through the test surfaces, and emerges as an aspherical wavefront to be analyzed.

An image of the interferogram is then formed on a photodetector and an electrical signal is generated containing phase information corresponding to the difference between the anticipated wavefront generated by the test optic and the measured wavefront (Block 108).

Afterwards, phase shifting interferometry or other suitable analytical interferometric methodology is performed to extract the phase information from the electrical signal and calculate the test optic performance and its departure from its design specification (Block 110).

The calculated information is then outputted to file, as alphanumeric hardcopy display form, and/or graphical form (Block 112).

Figure 5:
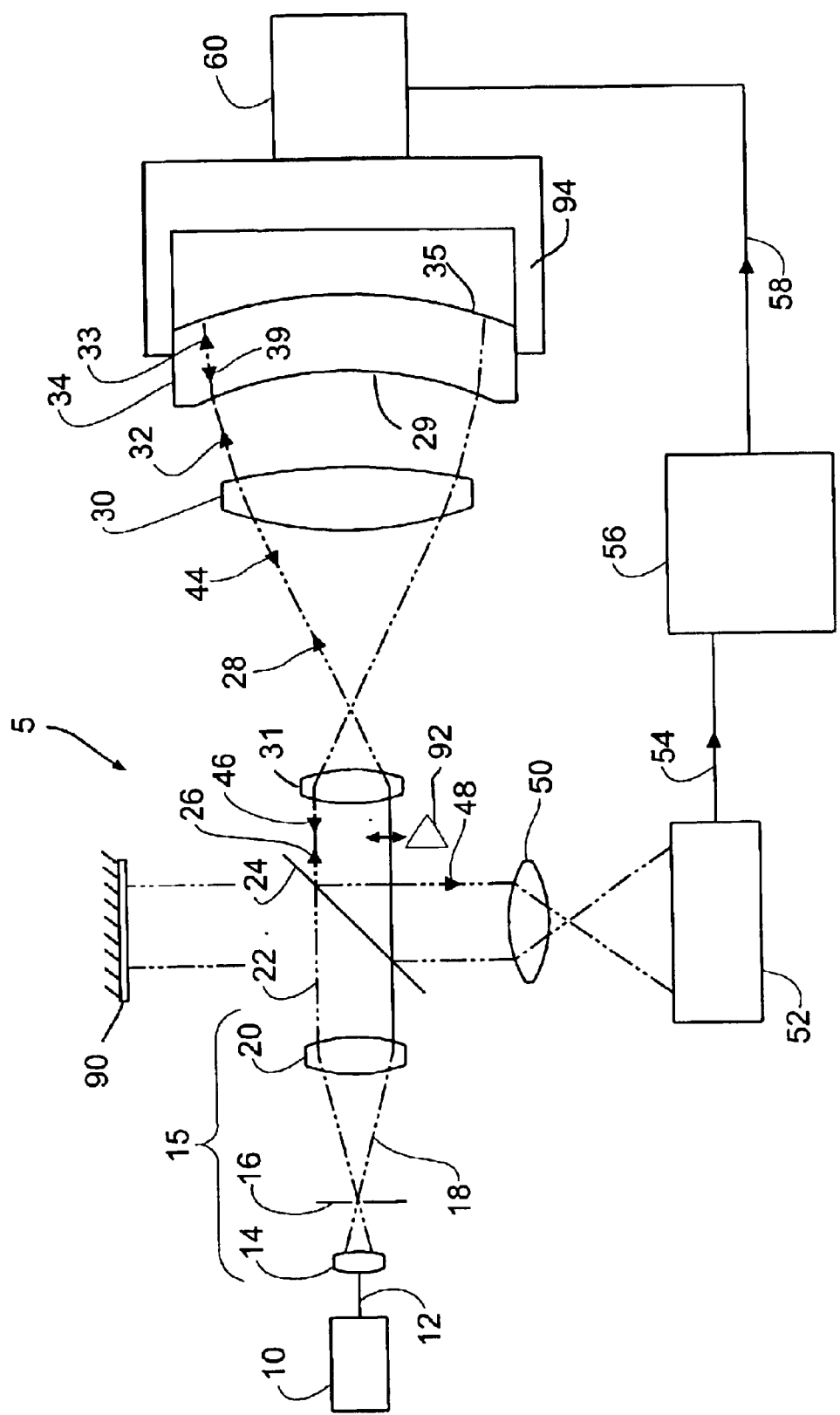
FIG. 5 is a diagrammatic elevational view of apparatus for illustrating a method for aligning the aspheric reference surface of FIG. 1 with the aspheric wavefront illuminating it.

Reference is now made to FIG. 5 which illustrates the apparatus of FIG. 1 configured to align the aspherical reference surface 35 with the wavefront 33 impinging on it. All elements of FIG. 1 reappearing here carry the same numerical identification as in FIG. 1.

A preferred method by which the system 5 in FIG. 5 is aligned for measuring reflecting aspheric surfaces first requires inserting a retroreflector 92 into the path of beam 26 (See the double arrow travel indicated) and hence its corresponding wavefront. A plane mirror 90 (Adjustments not shown) is then aligned to the wavefront from 92 using an interference pattern from wavefronts reflected from 90 and 92. This makes plane mirror 90 perpendicular to beam 26.

Next, retroreflector 92 is removed from the path of beam 26, element 34 is attached to positioning device 60 via a mounting bracket 94. Using positioning device 60, reflected wavefront 39 is aligned to plane mirror 90. The result of this alignment procedure assures that aspherical reference surface 35 is aligned with the wavefront of beam 26 so that reflecting aspheres may be accurately measured. The method by which system 5 is aligned for accurately measuring refracting optics using a "master" optic has been previously described.

Other variations of the invention will occur to those skilled in the art based on its teachings. For example, it will be evident that the reference aspheric surfaces may be simulated at least in part by their holographic equivalent. Therefore, it is intended that all such variations be within the scope of the invention.

What is claimed is:

1. An interferometric method for measuring rotationally and non-rotationally symmetric optics, said interferometric method comprising the steps of:
   aligning a test optic to be measured and at least one aspheric reference surface placed closely adjacent the test optic by a predetermined distance;
   illuminating said at least one aspheric reference surface with a beam having a predetermined wavefront such that part of said predetermined wavefront is reflected from said aspheric reference surface to serve as a reference wavefront and part is transmitted as a continuing aspherical wavefront whose shape changes as it propagates across said predetermined distance such that it impinges on the said test optic with a shape that substantially conforms to the anticipated shape of said test optic and returns therefrom as a measurement wavefront that travels back towards said aspheric reference surface; and
   combining said reference and measurement wavefronts to form an interferogram containing phase information indicative of the shape of the wavefront generated by the test optic.

2. The interferometric method of claim 1 further including the step of imaging said interferogram onto a photodetector and generating an electrical signal containing phase information corresponding to the difference between the shape of the anticipated wavefront generated by the test optic and its actual performance.

3. The interferometric method of claim 2 further including the step of performing phase shifting interferometry to extract said phase information from said electrical signal and calculate the test optic performance.

4. The interferometric method of claim 3 further including the step of outputting said calculated information in one or more of a file, alphanumeric hardcopy, display, and graphic.

5. The interferometric method of claim 1 wherein said test optic is a rotationally symmetric aspherical reflective surface and said aspheric reference surface has a shape of the form:

$$Z_r(r)=Z_a(r+d\sin\alpha)+(d\cos\alpha)$$

where d is the distance separating said aspheric reference surface and said test aspherical surface, $Z_a$ is the shape of the test aspherical surface as a function of r, and $\alpha$ is the local slope of paid aspheric reference and test aspherical surfaces at normal incidence and is given by $$\alpha = \tan^{-1}\left(\frac{dZ_a(r)}{dr}\right).$$

6. The interferometric method of claim 1 wherein said test optic is a non-rotationally symmetric aspherical reflective surface and said aspheric reference surface has a shape of the form:

$$Z_r(x,y)=Z_a(x+d\sin\alpha_1, y+d\sin\alpha_2)+d(1-\sin^2\alpha_1-\sin^2\alpha_2)^{1/2}$$

where d is the distance separating said aspheric reference surface and said test aspherical surface, $Z_a$ is the shape of the test aspherical surface as a function of r, and $\alpha_1$ and $\alpha_2$ are the local slopes of said aspheric reference and test aspherical surfaces at normal incidence and are given by:

$$\alpha_1 = \tan^{-1}\left(\frac{\partial Z_a}{\partial x}\right) \text{ and } \alpha_2 = \tan^{-1}\left(\frac{\partial Z_a}{\partial y}\right).$$

7. The interferometric method of claim 1 wherein said test optic is refractive and said aspheric reference surface comprises at least two reference aspherical surfaces one each of which is located on either side of said refractive test optic.

8. Interferometric apparatus for measuring rotationally and non-rotationally symmetric test optics, said interferometric apparatus comprising:
   means for mounting a test optic to be measured so that it can be illuminated as it is precisely aligned;
   at least one reference aspherical surface aligned with and closely placed adjacent said test optic to be measured and spaced therefrom by a predetermined distance; and
   means for illuminating said at least one reference aspherical surface with a beam having a predetermined wavefront whose shape is substantially the same as that of said reference aspherical surface so that part of said predetermined wavefront is reflected from said reference aspherical surface to serve as a reference wavefront and part is transmitted as a continuing aspherical wavefront whose shape changes as it propagates across said predetermined distance such that it impinges on the said test optic with a shape that substantially conforms to the anticipated shape of said test optic and returns therefrom as a measurement wavefront that travels back towards said reference aspherical surface, said reference and measurement wavefronts combining to form an interferogram containing phase information indicative of the shape of the wavefront generated by the test optic.

9. The interferometric apparatus of claim 8 further including means for imaging said interferogram onto a photodetector and generating an electrical signal containing phase information corresponding to the difference between the anticipated shape of the wavefront generated by the test optic and its actual performance.

10. The interferometric apparatus of claim 9 further including means for performing phase shifting interferometry to extract said phase information from said electrical signal and calculate the test optic performance.

11. The interferometric apparatus of claim 10 further including means for outputting said calculated information in one or more of a file, alphanumeric hardcopy, display, and graphic.

12. The interferometric apparatus of claim 8 wherein said test optic is a rotationally symmetric reflective aspherical surface and said reference aspherical surface has a shape of the form:

$$Z_r(r)=Z_a(r+d\sin\alpha)+(d\cos\alpha)$$

where d is the distance separating said reference aspherical surface and said test aspherical surface, $Z_a$ is the shape of the test aspherical surface as a function of r, and $\alpha$ is the local slope of said reference and test aspherical surfaces at normal incidence and is given by $$\alpha = \tan^{-1}\left(\frac{dZ_a(r)}{dr}\right).$$

13. The interferometric apparatus of claim 8 wherein said test optic is a non-rotationally symmetric aspherical reflective surface and said reference aspherical surface has a shape of the form:

$$Z_r(x,y) = Z_a(x + d\sin\alpha_1, y + d\sin\alpha_2) + d(1 - \sin\alpha_1 - \sin^2\alpha - \sin^2\alpha_2)^{1/2}$$

where d is the distance separating said reference aspherical surface and said test aspherical surface, $Z_a$ is the shape of the test aspherical surface as a function of r, and $\alpha_1$ and $\alpha_2$ are the local slopes of said reference and test aspherical surfaces at normal incidence and are given by:

$$\alpha_1 = \tan^{-1}\left(\frac{\partial Z_a}{\partial x}\right) \text{ and } \alpha_2 = \tan^{-1}\left(\frac{\partial Z_a}{\partial y}\right).$$

14. The interferometric apparatus of claim 8 wherein said test optic is refractive and said reference aspherical surface comprises at least two reference aspherical surfaces one each of which is located on either side of said refractive test optic.

15. The interferometric apparatus of claim 13 further including, means for aligning said reference aspheric surface with said illuminating predetermined wavefront at least prior to measuring a test reflective aspheric surface.

* * * * *